United States Patent [19]
Blechman

[11] 3,720,109
[45] March 13, 1973

[54] FLUID-OPERATED SAMPLER AND FLOWMETER

[75] Inventor: Robert M. Blechman, Honey Brook Township, Chester County, Pa.

[73] Assignee: Pro-Tech, Inc., Malvern, Pa.

[22] Filed: May 3, 1971

[21] Appl. No.: 139,759

[52] U.S. Cl. .................................................73/421 B
[51] Int. Cl. ................................................G01n 1/14
[58] Field of Search .....................................73/421 B

[56] References Cited

UNITED STATES PATENTS 3,120,128  2/1964  Snyder................................73/421 B

OTHER PUBLICATIONS

Flowmeters for Laboratory and Industrial Use, Catalog No. FM-1, Kontes Glass Co., Vineland, N.J., pp. 6.

Primary Examiner—S. Clement Swisher
Attorney—McClure & Millman

[57] ABSTRACT

Sampling apparatus is operated by continuous flow of fluid from a pressurized source through a regulating valve and a flowmeter having dual floats. At intervals determined by the flow rate a pressure-sensitive valve releases accumulated fluid to propel sampled medium from a sample intake to a collection location. Principal uses are in stream monitoring for pollution control, sewage treatment facilities, and industrial waste reduction programs.

11 Claims, 7 Drawing Figures

INVENTOR.
ROBERT M. BLECHMAN
BY McClure & Millman
ATTORNEYS.

INVENTOR
ROBERT M. BLECHMAN
BY McChirg + Millman
ATTORNEYS.

PATENTED MAR 13 1973

INVENTOR.
ROBERT M. BLECHMAN
BY McGlew & Milman
ATTORNEYS.

FLUID-OPERATED SAMPLER AND FLOWMETER

This invention relates to apparatus for sampling a medium for analysis, such as to determine composition of contaminants therein, especially sampling apparatus operated by compressed fluid, and concerns also a flowmeter and related means for determining sampling frequency in such apparatus.

Manual techniques for sampling a medium for analysis or related purposes are giving way to automatic sampling, usually electrically operated. Devices for setting frequency of sampling include spring-driven and electrical timing devices. Electrical operation is hazardous in an explosive atmosphere, such as may be encountered in oil refineries and other industrial operations, in sewers and sewage treatment plants, and in pollution-ridden areas. Electrical power lines are not available at remote sampling sites, and batteries often are cumbersome or otherwise unsatisfactory.

A primary object of the present invention is provision of fluid-operated sampling apparatus with means including a flowmeter for determining sampling frequency.

Another object is provision of such apparatus with an extended range of sampling frequency, from very frequent to very infrequent.

A further object is provision of a flowmeter characterized by corresponding extension in range.

Other objects of this invention, together with means and methods for attaining the various objects, will be apparent from the following description and the accompanying diagrams.

In general, the objects of the present invention are accomplished by means of fluid-operated sampling apparatus comprising a source of gas under superatmospheric pressure, a collection vessel, a sample chamber therebetween for immersion in a medium to be sampled and having a passage for intake of sampled medium and a check valve in the passage, and conduit means interconnecting the gas source to the sample chamber, the conduit means including a flowmeter having an upright tube with a pair of floats therein, one above the other, the upper one being light and the lower one heavy relative to one another, and valve means having a normally closed position located between the flowmeter and the chamber and adapted to open at a given accumulated gas pressure and to close at a lesser pressure, the conduit means including tubular interconnection between the flowmeter and the valve means and including also tubular interconnection to the sample chamber in the open valve position only.

As a particular feature, the invention includes an improved flowmeter comprising an upper tube having an inlet and an outlet for fluid, with the inlet located below the outlet; and a plurality of floats located one above the other in the tube and having different densities, the lowermost float being densest and the uppermost being least dense.

Figure 1:
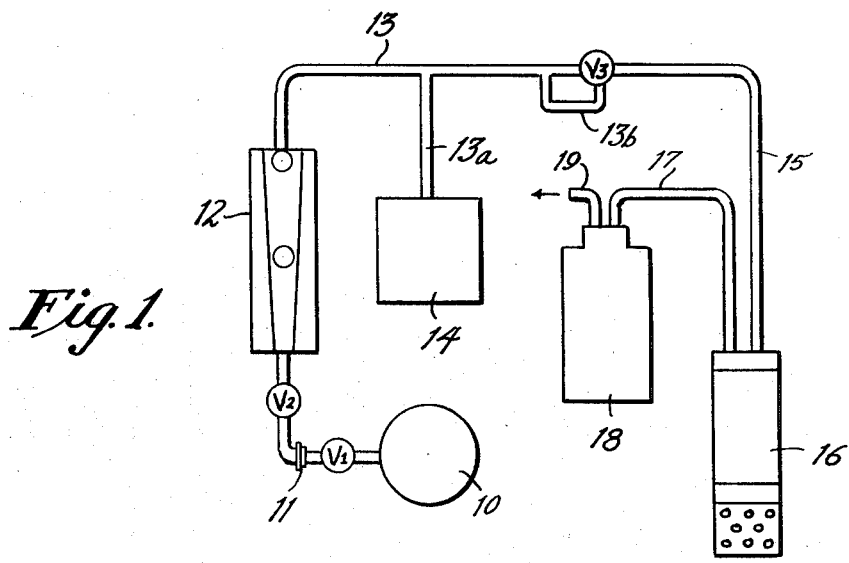
FIG. 1 is a schematic diagram of sampling apparatus according to the present invention.

FIG. 1 represents sampling apparatus of the present invention having the following principal components interconnected and valved as indicated: source 10 of fluid under pressure, flowmeter 12, ballast or surge tank 14, sample chamber 16, and collection vessel 18.

Fluid source 10 with adjustable outlet valve $V_1$ and flowmeter 12 with inlet regulator valve assembly $V_2$ are interconnected to one another by coupling 11 and adjoining piping. From the flowmeter, conduit 13 leads to pressure-sensitive valve means $V_3$ and has branch 13a to tank 14 and also has branch 13b to an actuating portion of the same valve means. Tube 15 leads from the valve means to sample chamber 16, while tube 17 leads therefrom to collection vessel 18, which also has vent 19.

Figure 2:
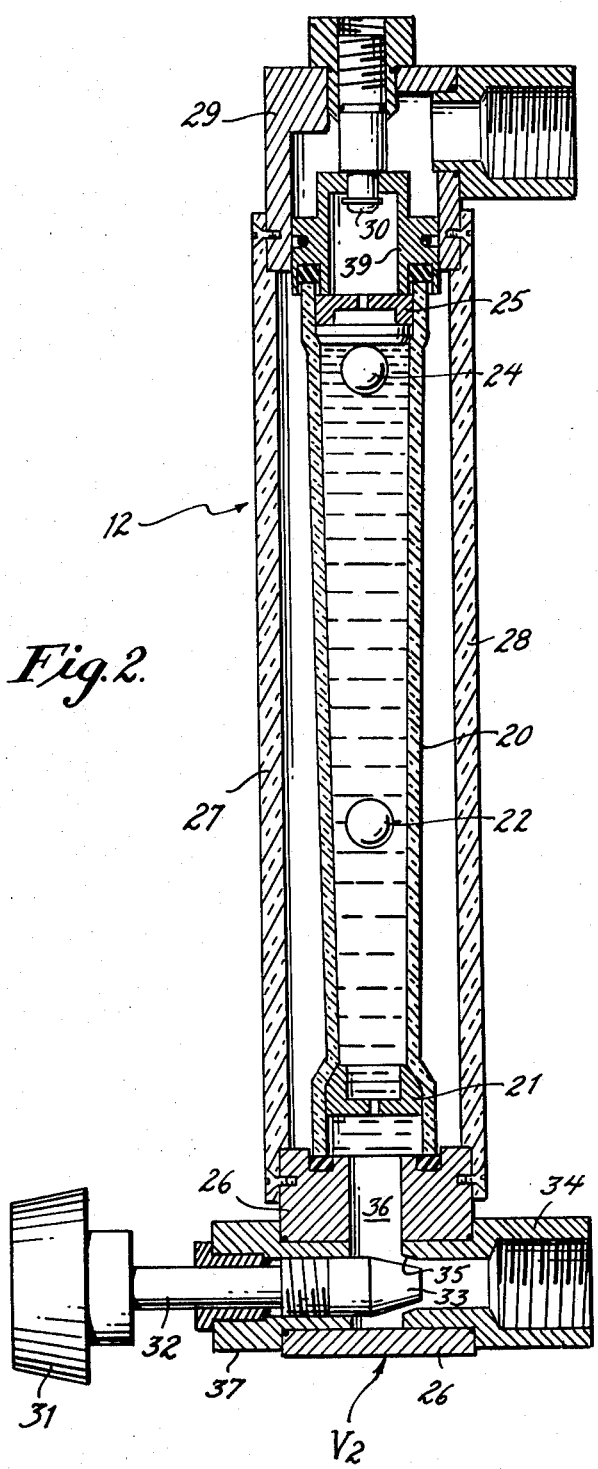
FIG. 2 is a side sectional elevation of flowmeter means shown schematically in the preceding view.

FIG. 2 shows flowmeter 12 having the following principal parts constructed and arranged as indicated: inlet valve assembly $V_2$, tapered metering tube 20 suitable gasketed at both ends, having float stop 21 at the bottom and float stop 25 at the top, and containing lower ball float 22 and upper ball float 24 therebetween. Vertical front (at left) and rear walls 27 and 28 flank the metering tube and extend upward from base 26 in the vicinity of the inlet valve assembly at the bottom to outlet assembly 29 at the top and are secured thereto by the indicated screws. Similar right and left walls are not shown; at least front vertical wall 27 is transparent. Spindle 30 threaded into a vertical bore in the outlet fitting holds the metering tube in place through intermediary fitting 39.

Inlet valve assembly $V_2$ includes adjusting knob 31 on one end of valve stem 32 having needle valve 33 at the other end opposite seat 35 in inlet fitting 34, which is pressed into the back of base 26 and communicates with the metering tube via bore 36 through the base. Valve support 37 is pressed similarly into the front of the base.

Figure 3:
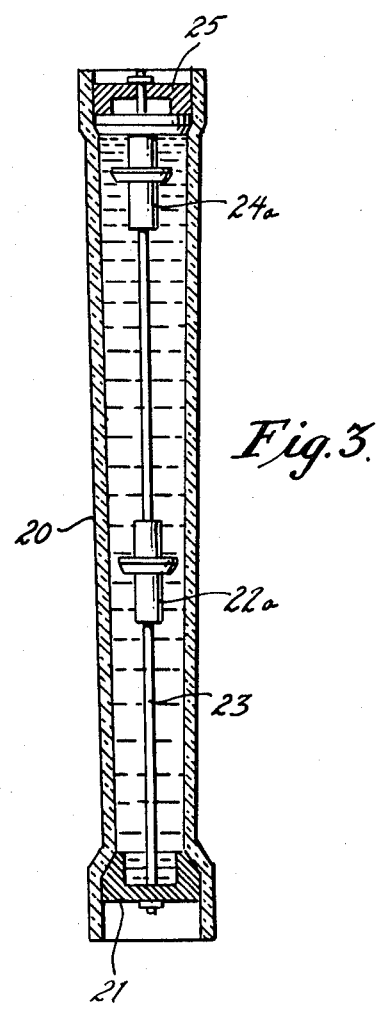
FIG. 3 is a fragmentary view of an alternative embodiment of the apparatus of FIG. 2.

FIG. 3 shows alternative lower and upper floats 22a and 24a, which have a central vertical bore and are mounted slidably on guide rod 23 located axially in metering tube 20. Such an arrangement may be substituted for the unguided ball float arrangement of FIG. 2.

It should be understood that in both the float arrangement of FIG. 2 and that of FIG. 3 the lower float is heavier and the upper float lighter in weight. This means that equalsized floats have correspondingly different densities, the lowermost float being most dense, and the uppermost float being least dense. One or more additional floats (not shown) of intermediate density may be added therebetween, if desired, in accordance with this invention.

Figure 4A:
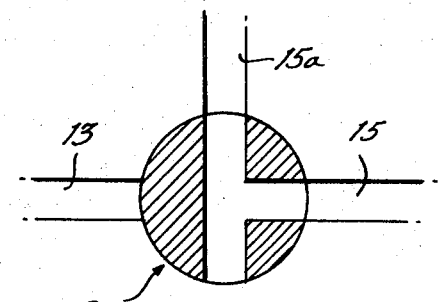
FIGS. 4a and 4b are more detailed schematic views of valve means shown schematically in FIG. 1.
Figure 4B:
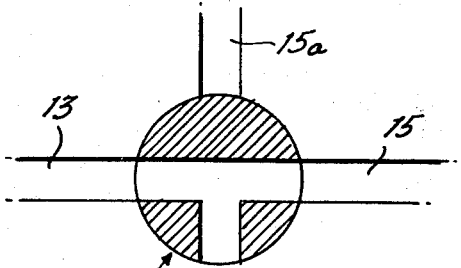

FIGS. 4a and 4b show schematically the alternative positions of valve means $V_3$ in the normally closed and activated open positions, respectively. Thus, in FIG. 4a, tubing 15 to sample chamber 16 is vented through the valve means to vent 15a without any connection to conduit 13 or to surge tank 14 via branch 13a (FIG. 1). When actuated, as in FIG. 4b, the valve means establishes such connection from conduit 13 to tubing 15 and closes off vent 15a. Branch 13b through which fluid pressure is applied to the actuating mechanism of the valve means is omitted from FIGS. 4a and 4b but appears in the next view.

Figure 5:
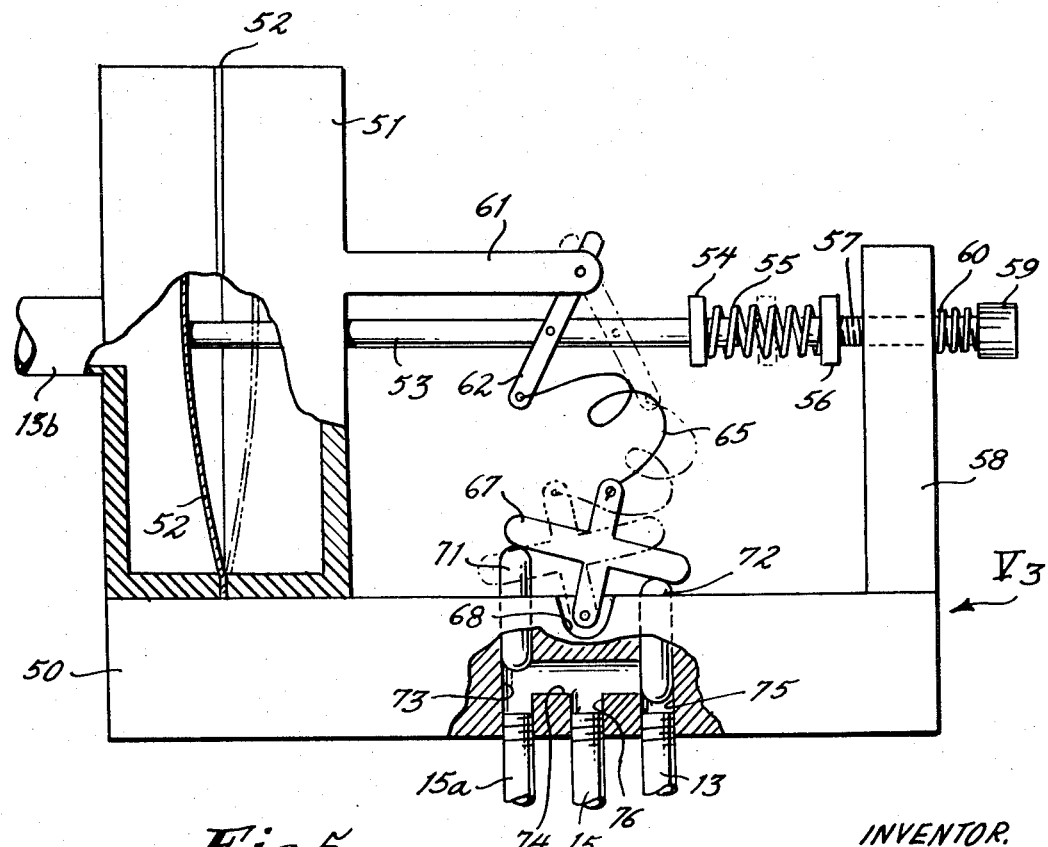
FIG. 5 is a side elevation, partly in section, of the apparatus of FIG. 4.

FIG. 5 shows pressure-sensitive valve means $V_3$ in some detail although simplified structurally in various respects for clarity of illustration. Base 50 supports diaphragm chamber 51 containing diaphragm 52, shown in full lines with the medial portion thereof displaced in a rest position to the left (and with an alternative position of displacement to the right shown in broken lines). Branch 13b of the fluid conduit from the flowmeter communicates with the left half of the diaphragm chamber.

Affixed to diaphragm 52 at the center of its right side is horizontal push rod 53, which extends through a suitable opening in the right half of the diaphragm chamber and has collar-like boss 54 near its right end. Upright support 58 at the right side of the base has adjustment rod 57 threaded horizontally therethrough in alignment with push rod 53. The adjustment rod has collar-like boss 56 near the left end. Compression spring 55 fits over the adjacent ends of the diaphragm push rod and the adjustment rod and is flanked at its ends by the bosses on the respective rods. The opposite end of the adjustment rod carries adjusting knob 59, and compression spring 60 surrounds the rod between the support and the knob.

Extending from the right side of the diaphragm chamber in FIG. 5 is arm 61, which by means of a horizontal pin therethrough supports lever 62 pivotally at its upper end. The lever is pivoted intermediate its ends on a horizontal pin through diaphragm push rod 53. At its lower end the lever has an opening accommodating one end of W-spring 65. The opposite end of the W-spring is hooked in an opening in the upper arm of cross 67 whose lower arm is pivoted in recess 68 on a horizontal pin carried by base 50. Located in pair of vertical bores 73 and 75 under the cross arms at the left and right, respectively, are respective valves 71 and 72. Transverse bore 74 interconnects the vertical bores in position to be closed by the valves and is intersected midway by short vertical bore 76 to the bottom of the base. Bore 73 terminates in vent 15a, while conduit 13 is threaded into the end of bore 75, and tubing 15 into the end of bore 76.

In FIG. 5 broken lines show alternative positions of diaphragm 52, push rod 53, lever 62, W-spring 65, cross 67, and valves 71 and 72. In the solid-line position, left valve 71 is in the upper or open position interconnecting bore 73 to bore 74 and thus to bore 76, while right valve 72 is in the lower or closed position, sealing bore 75 off from bore 74 and thus from bore 76. In the alternative or broken-line position valve 71 is closed and valve 72 is open. The open position of the respective valves is assured by back-pressure thereto through the vertical bore in which each is located, but biasing springs may be added, if desired.

Figure 6:
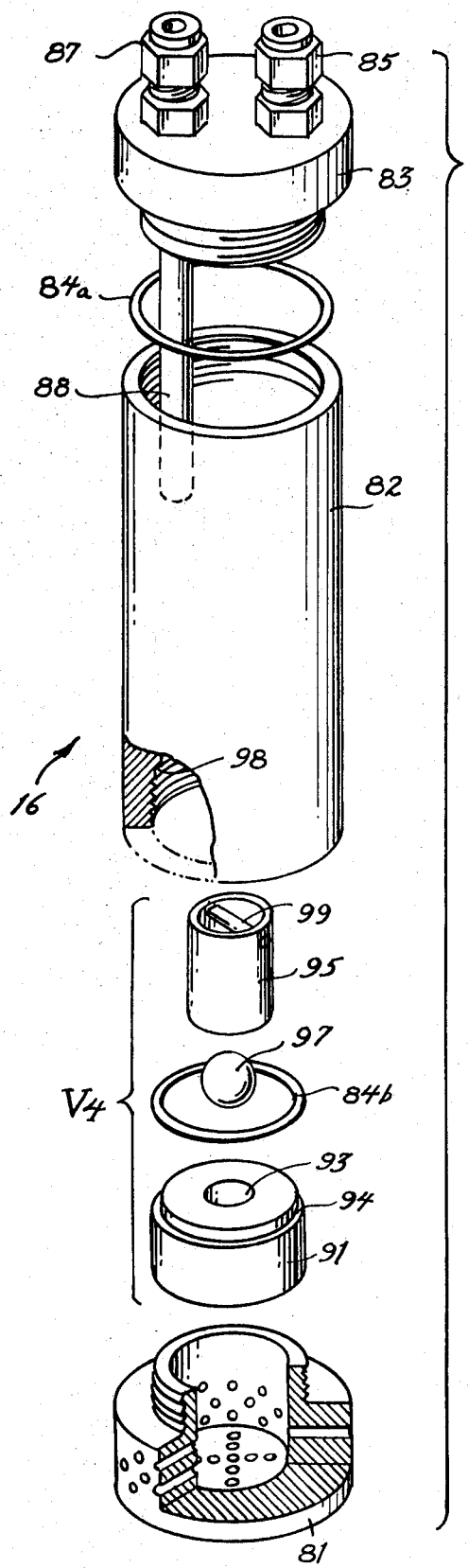
FIG. 6 is an exploded perspective view of sample chamber means shown schematically in FIG. 1.

FIG. 6 shows sample chamber 16 in more detail. Bottom cap 81, which threads at its reduced upper end into the bottom end of cylindrical chamber body 82, has openings therethrough to admit some of the surrounding medium to the chamber interior. Top cap 83, which has fitting 85 for tube 15 and fitting 87 for tube 17 aligned with bores (not visible) therethrough, threads at its reduced lower end into the top end of chamber body 82. Toroidal gaskets or O-rings 84a, 84b are located at the top and bottom ends to seal the sample chamber when the caps are threaded into the respective ends of the body. Located just above bottom cap 81 is check valve assembly $V_4$, which comprises seat 91, cage 95 mounted thereon, and ball 97 secured in the cage by transverse pin 99 at the top end. The seat has sample intake bore 93 axially therethrough and has indented top peripheral edge 94. Lower O-ring 84b fits about that edge and against internal shoulder 98 in the chamber body (shown partly cut away to reveal the interior). Extending downward from the top cap into the chamber body is dip tube 88, which terminates alongside cage 95 of the check valve when the sample chamber is assembled.

Operation of this apparatus to practice the process of this invention is readily understood. With pressurized fluid source 10 connected and valve $V_1$ opened, the setting of valve $V_2$ determined the rate of escape of fluid from the source and through flowmeter 12. Flow of fluid through the flowmeter displaces at least the least dense float upward, and if the least dense float reaches the upper float stop then the next denser float (the second float if two are being used, as shown and described) is displaced also to some extent. In any event the extent of displacement of the densest displaced float is an index of the flow rate (or volume of fluid per unit time). Such use of a plurality of floats of suitably different densities provides a considerably expanded scale of flow rate. Use of two floats, identical in all respects except for being composed of nylon and steel, for example, provides good continuity of scale.

Fluid passing through the flowmeter accumulates in surge tank 14 and the conduits communicating therewith, raising the pressure therein, including branch 13b to pressure-sensitive diaphragm 52 and associated parts of valve means $V_3$. Displacement of the diaphragm and attached push rod to the right against the bias of spring 55 pivots lever 62. Such pivoting compresses the arms of W-spring 65 without altering the position of valve-actuating cross 67 until the lever approximates a vertical position, whereupon the spring expands and switches the cross abruptly to its alternate position in which the surge tank is connected to tubing 15, which leads to the sample chamber.

The influx of fluid, usually gas, into sample chamber 16 forces check valve $V_4$ closed and forces the contents of sampled medium out of the chamber through tubing 17 and into collection vessel 18. Excess fluid vents to the atmosphere through vent 19. After escape of sufficient fluid to lower the surge tank pressure appreciably, spring 55 forces the diaphragm push rod backward, eventually switching cross 67 back to its original position through the intervention of W-spring 65; that reversal disconnects the surge tank from the sample chamber and reconnects it to the valve vent to the atmosphere, whereupon the next sample of medium is permitted to enter the sample chamber through the check valve assembly.

As fluid for determining the sampling rate and for propelling successive samples from the sample chamber to the collection vessel, it is most convenient to employ an inert gas (which may be stored in liquid form in a source vessel) such as nitrogen, carbon dioxide, halogenated hydrocarbon, or even compressed air (if possible effect upon oxygen content of the sample is not important). Suitable fluids are sold, chiefly for refrigerant use, under such brand names as "Freon" (du Pont) and "Isotron" (Pennwalt). With such fluid as the propellant, the sampling times for stainless steel and nylon ball floats are set forth in the following table.

TABLE: Sampling Frequency (mins.)

| Flowmeter Reading | Nylon Float | Steel Float |
|---|---|---|
| 1 | 30 | 6 |
| 2 | 15 | 3.5 |
| 3 | 10 | 2.5 |
| 4 | 9 | 2 |
| 5 | 7 | 1.5 |

Readings were taken at the center of the lowermost displaced float. The valve actuation pressure was 10 psi with on-off differential of 2 psi.

Usually the medium sampled is aqueous, whether from natural streams, water supplies, sewage systems, or industrial effluents. However, it may be non-aqueous, such as oil, gasoline, or other organic liquid. The dimensions of the apparatus are dependent upon the nature of the sampled medium, including the concentration, nature, and size of any solids therein. The materials of construction should be suitably inert, of course, with regard to the medium to be sampled. Ordinarily the sampling apparatus can be made portable to permit its ready transportation to and from almost any sampling site.

Effective sampling is a prerequisite to analysis and/or treatment of the medium in question, such as for pollution control. Good regulation of sampling frequency is required in the formation of composite samples. The apparatus of this invention permits a wide range of sampling frequency with accurate and ready regulation thereof. No electricity or conventional mechanical power source is required, and the explosion hazard usually associated with electrical activation is eliminated.

Whereas a particular apparatus embodiment and certain modifications therein have been described, other modifications may be made, as by addition, combination, or division of parts or steps, or by substitution of equivalents therefor, while retaining at least some of the advantages and benefits of the invention, which itself is defined in the following claims.

The claimed invention:

1. In fluid-operated sampling apparatus for use with a source of propulsion fluid, the combination of means for admitting a liquid sample from a body of liquid, a collection vessel for such sample, and conduits joining the source to the admitting means and joining the admitting means to the collection vessel; and, in the conduit between the source and the admitting means, a flowmeter comprising an upright tube having an inlet and an outlet for fluid, with the inlet located below the outlet, and a plurality of floats located one above the other in the tube and having different densities, the lowermost float being densest and the uppermost float being least dense.

2. Apparatus according to claim 1, wherein the floats are spherical and of equal size.

3. Apparatus according to claim 2, wherein there are two floats, one being composed at least principally of metal, and the other being composed at least principally of plastic.

4. Fluid-operated sampling apparatus comprising a source of gas under superatmospheric pressure, a sample chamber therebetween for immersion in a medium to be sampled and having a passage for intake of sampled medium and a check valve in the passage, and conduit means interconnecting the gas source to the sample chamber, the conduit means including a flowmeter having an upright tube with a pair of floats therein, one above the other, the upper one being light and the lower one heavy relative to one another, and valve means having a normally closed position located between the flowmeter and the chamber and adapted to open at a given accumulated gas pressure and to close at a lesser pressure, the conduit means including tubular interconnection between the flowmeter and the valve means and including also tubular interconnection to the sample chamber in the open valve position only.

5. Apparatus according to claim 4, including a sample collection vessel and tubular interconnection of the sample chamber thereto.

6. Apparatus according to claim 4, including an adjustable control valve between the gas source and the flowmeter.

7. Apparatus according to claim 4, including a surge tank interconnected to the conduit means upstream of the accumulator valve means.

8. Liquid-sampling apparatus utilizing sample-propulsion fluid supplied from a source thereof and comprising a sample-admitting chamber for contact with a body of liquid to be sampled, a sample-collection vessel, conduit means interconnecting the chamber with the source and the vessel with the chamber, a flow-regulating valve and a dual-float flowmeter interposed in the conduit means between the source and the chamber, and a normally closed switching valve interposed in the conduit means between the chamber and the vessel and openable to admit propulsion fluid to the chamber so as to propel a liquid sample from the chamber into the vessel.

9. Liquid-sampling apparatus according to claim 8, wherein the switching valve is responsive to the pressure of propulsion fluid therein and is adapted to switch open whenever a given level of pressure is reached and to reclose responsive to reduction of the pressure to a given lower level upon flow of the propulsion fluid therethrough.

10. In fluid-operated sampling apparatus for use with a source of gas under superatmospheric pressure, a sample chamber for immersion in a medium to be sampled and having a passage for intake of sampled medium and a check valve in the passage, first conduit means for interconnecting the gas source to the apparatus and second conduit means for interconnecting the apparatus to the sample chamber, the improvement comprising a flowmeter adapted to be interconnected to the first conduit and having an upright tube with a pair of floats therein, one above the other, the upper one being light and the lower one heavy relative to one another, valve means having a normally closed position and being located downstream of the flowmeter therein and being adapted to open at a given accumulated gas pressure and to close at a lesser pressure and a surge tank located between the flowmeter and the valve means and interconnected to both for interconnection to the sample chamber in the open valve position only.

11. Liquid-sampling apparatus according to claim 10, including a flow-regulating valve in line between the gas source and the float tube, the upper float being adapted to be suspended between the ends of the tube by the flow of gas therethrough at relatively low flow rates, and the lower float being adapted to be suspended between the ends of the tube by the flow of gas therethrough at relatively high rates, dependent upon the degree to which the valve is opened.

* * * * *